US011064100B2

(12) United States Patent
Wacey

(10) Patent No.: US 11,064,100 B2
(45) Date of Patent: Jul. 13, 2021

(54) STEREO CAMERA AND IMAGING SYSTEM

(71) Applicant: EtherSec Industries Ltd, London (GB)

(72) Inventor: Adam Wacey, London (GB)

(73) Assignee: EtherSec Industries Ltd, London (GB)

( * ) Notice: Subject to any disclaimer, the term of this patent is extended or adjusted under 35 U.S.C. 154(b) by 0 days.

(21) Appl. No.: 16/546,616

(22) Filed: Aug. 21, 2019

(65) Prior Publication Data

US 2020/0084353 A1 Mar. 12, 2020

(30) Foreign Application Priority Data

Aug. 23, 2018 (GB) .................................. 1813740
Sep. 27, 2018 (GB) .................................. 1815755

(51) Int. Cl.
*H04N 5/225* (2006.01)
*H04N 13/239* (2018.01)
*H04N 5/232* (2006.01)

(52) U.S. Cl.
CPC ....... *H04N 5/2258* (2013.01); *H04N 5/23212* (2013.01); *H04N 13/239* (2018.05)

(58) Field of Classification Search
CPC .................................................. H04N 5/2258
See application file for complete search history.

(56) References Cited

U.S. PATENT DOCUMENTS

| | | | |
|---|---|---|---|
| 5,570,150 A * | 10/1996 | Yoneyama | G03B 35/10 396/324 |
| 5,835,133 A | 11/1998 | Moreton et al. | |
| 6,944,328 B2 * | 9/2005 | Yoshida | H04N 19/597 382/154 |
| 8,125,109 B2 * | 2/2012 | Dold | G05B 19/052 307/326 |
| 2002/0071616 A1 | 6/2002 | Yoshida | |
| 2011/0279655 A1 * | 11/2011 | Tan | G03B 35/10 348/49 |
| 2012/0154549 A1 | 6/2012 | An | |
| 2013/0128005 A1 | 5/2013 | Cheng et al. | |
| 2017/0084048 A1 * | 3/2017 | Tasaki | G06T 7/73 |
| 2019/0075284 A1 * | 3/2019 | Ono | H04N 7/18 |
| 2019/0163964 A1 * | 5/2019 | Kawamae | G06K 9/00624 |

FOREIGN PATENT DOCUMENTS

EP 2386898 1 11/2011

* cited by examiner

*Primary Examiner* — Gary C Vieaux
(74) *Attorney, Agent, or Firm* — Smartpat PLC

(57) ABSTRACT

A stereo camera, including an imaging sensor, and an optical apparatus comprising first and second apertures separated by an interocular distance and configured to focus first and second images on the imaging sensor in a side by side arrangement. An imaging system including the stereo camera, and at least one image processor, configured to receive first and second frames of image data from a stereo camera, and construct volumetric image data based on binocular disparity between the first and second frames.

13 Claims, 4 Drawing Sheets

STEREO CAMERA AND IMAGING SYSTEM

TECHNICAL FIELD

The present disclosure relates to a stereo camera and imaging system for capturing and ingesting binocular stereo images. The present disclosure further relates to volumetric image processing for subsequent video analytics operations.

BACKGROUND

The last ten years have seen the introduction of "video analytic" machines that perform image processing tasks against incoming streams of video. This video may be derived from cameras or archives, which themselves may be located remotely or locally. Though the potential application of video analytics is very broad, one application which has proven useful, is in the security industry, where video analytics have been applied to the task of looking for specific events, in effect replacing costly and error prone human monitoring of video streams.

The mechanisms to identify some classes of specific events remain elusive. However, over the last few years, one class of problems has started to be solved, namely: to decide whether a human intruder has entered a "safe zone". Problematic conditions that are typically encountered in this seemingly simple task include: changing light conditions, moving background objects (such as trees, plants and water) and foreground objects such as pets, moving vehicles or rain falling on the camera or insects, attracted by the warmth of infra-red lights, crawling across the lens. All these problems, singly or in combination, are often encountered over a time period as short as an hour and each has the potential to fool state of the art video analytic machines into producing a false positive alarm event. Mechanisms to reduce the occurrence of these false positives would thus prove beneficial.

One feature, which is at the root of many of the problems described above, is a result of the camera creating a two-dimensional (2D) frame of pixels out of a "real world" three-dimensional (3D) scene. This process requires that the 3D scene be projected into a 2D sensor plane and this projection introduces significant problems, since very large quantities of information intrinsic to the 3D scene are lost in the transformation to 2D. For instance, if an object is observed in the 2D plane as moving slowly across the frame, is the projecting (real), object a small object close to the camera or a much larger object located in the distance and moving with great speed. This is but one example of the information lost by this process and there are many others known to one skilled in the art.

This intrinsic information lost when projecting from a 3D scene to a 2D plane is extraordinarily useful for a video analytics computers' attempt to "understand" a scene and this utility only increases as the scene becomes more complex and dynamic (e.g. a crowded location or an area of dense vegetation). Broadly speaking, this intrinsic information simplifies the creation of "clean data" suitable for subsequent Video Analytics processing.

An example of such a Video Analytic task could include classifying an object in a video stream as a human. The human can only move at a limited speed and physically manifest in a small range of heights and both of these pieces of information would be implicitly available from the 3D data. Thus, preserving this information would provide lower numbers of both false positives and false negatives events whilst yielding a higher number of true positives events.

To date, crude attempts have been made to reconstruct intrinsic 3D information from ingested 2D video using Video Analytics, often by employing variations of the pinhole camera model but these methods inevitably fail due to environmental factors common in even the simplest naturalistic scenes (e.g. a new foreground object occludes the observation of ground plane intersection). In 2D Video Analytics these problems become worse as the scene becomes more crowded and dynamic. Further, these fixed point 2D reconstruction methods fail when the camera viewport changes and so are problematic when employed by Pan/Tilt/Zoom cameras. For all of these reasons the pinhole camera methods described have proven unsatisfactory when employed in practice and thus some other mechanism to preserve this 3D information is clearly required.

3D information is often represented in computer science applications as a cloud of points projected into 3D computer space, with each point being a pixel with values in the X, Y and Z axis. These point clouds can be generated by a number of physical modalities. An example of one these modalities is a Time Of Flight (T.O.F.) camera, which measure the time it takes for a discrete, physical "unit" to be transmitted and then reflected back to the transmitter/receiver. Sound based TOF cameras are cheap to purchase and thus popular in the hobbyist robotics community. However, they only operate over very short distance (typically <1 m), they are thus usually only employed to help moving robots avoid scene clutter. A second type of TOF Camera employs structured light. Cheap, mass market, Infra-red structured light sensors are relatively common and have proven very successful in providing user interfaces for gaming consoles. However, these modalities are demonstratively impractical for an outside environment due to their poor range (<5 m) and because the infrared signal that they employ is lost in the noise of the daylight spectra of outside environments. A further version of the TOF cameras employs LASERs. These cameras are known by the acronym LIDAR (li[ght]+d[etecting] a[nd]r[anging]). Powerful LIDAR units, able to overcome the "noise" of the environmental background spectra, employ dozens of individual LIDAR transmitters/receivers rotating on a mechanical puck. These units have been used to successfully map the 3D environment as a point cloud in autonomous cars. However, these units are costly and so are economically unsuitable for a mass market.

A final modality to produce 3D point cloud data is found in stereo disparity images calculated from two (or more) imaging sensors. In 1838 Charles Wheatstone demonstrated that the two different image planes received by a viewer's eyes' are processed into a single, three dimensions view. Stereoscopic photography exploits this observation to create the illusion of a 3D scene: a pair of 2D images are captured, where both images represent a perspective on the same scene, each a minor deviation equal to the perspectives that both eyes naturally receive in binocular vision. Similarly, computer generated 3D scenes may also be calculated by employing a variant of Wheatstones' binocular effect. In this stereo mechanism frames from two cameras are ingested and the parallax effect of binocular vision is used to calculate the disparity of each pixel between the two frames. In the most common configuration, objects that are closer will be more separated in the camera streams than those that are further away. Thus, it is possible to calculate the depth (Z plane) of each pixel shared by both frames to yield a pronounced 3D point cloud of the camera views.

The process of searching for and matching all the pixels within a frame to a Z depth is highly computationally intensive and this precludes the possibility of running such calculations on a Central Processing Unit (CPU) in real time. However, the disparity matching algorithms employed are highly amenable to parallelisation so that they may be effectively run on the graphics co-processing boards available at consumer price points. Thus, real time stereoscopic pixel matching is now both a technically and commercially feasible technology.

This technology is agnostic to the light spectrum that the images are captured in. Thus, it can be used for visible light under daylight conditions and Infra-Red (IR) spectra at night. Similarly, the 3D information is maintained independent of camera frustum and so it is suitable for use by pan/tilt/zoom cameras.

Dual sensor stereo cameras utilising the principle of stereo disparity imaging described above are starting to find popular application in both robotics and self-driving cars. In these cameras, the imaging sensors are typically separated by a few centimetres (mimicking human intra ocular distance) and are synchronised to capture their images within a few milliseconds of each other (it is vital to match pixels in images that are from the same scene rather than two different scenes separated by time). Typically, each image undergoes rectification, in order to compensate for optical and mechanical differences between the two sensors and the difference between the location of patches of pixels in each image is calculated to infer each pixel's location in the depth plane.

The current generation of stereo cameras are subject to a range of technical problems. Conventional stereo cameras are expensive because the two separated sensors must be precisely and mathematically mapped onto each other in 3D space using rectification to reduce the search space for pixel disparity matching to a single horizontal line. Areas of high texture and contrast display more inter-pixel variability, thus, they are easier to uniquely match when generating the volumetric image using disparity calculations. Since the quantity of pixels captured reduces as a function of the distance from the camera, areas that are further away will have a lower resolution texture and thus worse Z plane attribution. This problem leads to the creation of ghost pixels surrounding objects in which wrongly attributed Z locations smear a halo of the object into the background. With this in mind the capacity to employ PTZ cameras to zoom into important regions and thus reduce the correspondence problem becomes obvious. Further, the correspondence problem empathises the advantage of using very high Mega Pixel cameras to capture as much texture as possible.

The current generation of stereo cameras generate raw RGB pixel data and then send this data to the computer to be processed. Since they send this data over a USB cable, the cameras have to be located in very close proximity to the Video Analytics processing unit, due to both the power draw the camera requires to operate two sensors and the enormous quantity of uncompressed video data that the camera must return, unattenuated and uncorrupted, to the processing unit. Thus, the advent of a stereo camera becomes irrelevant as the cost of the total installation is dominated by each camera requiring its own high-end PC located next to the camera capturing the scene.

A final observation is that the investment in infrastructure that comprises a CCTV network is substantial. Replacing even a small portion of this infrastructure is economically problematic.

Accordingly, it is desirable to provide stereo cameras that are of realistic cost and associated image processing and methods. In addition, it is desirable to provide image processing that is able to automatically classify video data whilst effectively reducing false positives.

SUMMARY

In one aspect, a stereo camera is provided. The stereo camera includes an imaging sensor, and an optical apparatus including first and second apertures separated by an interocular distance and configured to focus first and second images on the imaging sensor in a side by side arrangement.

By directing both images onto a single sensor, problems with cost, synchronisation and other issues described in the foregoing with respect to dual sensor stereo camera systems are overcome. The imaging sensor of the present disclosure is a single sensor such that no synchronization between a plurality of imaging sensors is required.

In embodiments, the imaging sensor comprises a regular array of image sensing elements. In embodiments, the imaging sensor comprises a single imaging sensor chip.

In embodiments, said optical apparatus includes an enclosure comprising the first and second apertures separated by the interocular distance and at least one mirror such that first and second light beams respectively entering the first and second apertures are reflected by the at least one mirror which subsequently reflect the first and second light beams to form a composite image including the first and second images on the imaging sensor, wherein the imaging sensor is configured to digitize the composite image.

Such an optical apparatus is simple to construct and low in cost.

In embodiments, the at least one mirror comprises first and second mirrors for respectively reflecting the first and second light beams onto a third mirror that reflects the first and second light beams side by side to form the composite image. In embodiments, the first and second light beams side by side are in parallel. In embodiments, the third mirror has one or more faces to reflect the light onto the sensor.

In embodiments, the stereo camera includes a mono camera including a mono camera lens and a mono camera imaging sensor as said imaging sensor and a first housing for the mono camera. In embodiments, the optical apparatus has a second housing. In embodiments, the second housing is mounted to the first housing to allow conversion of the mono camera to the stereo camera. Thus, a conventional mono-camera can potentially be retrofitted with the optical apparatus in order provide a stereo camera without having to install a completely new system.

In embodiments, the imaging sensor has a megapixel resolution. Since only one imaging sensor is required, it is cost feasible to include high resolution imaging chips, which allows enhanced efficacy in the classification of objects or other image processing operations.

In embodiments, the stereo camera includes a controller for the imaging sensor such that a frame rate is at 50 frames per second, fps, at least 100 fps, at least 200 fps, at least 500 fps. In embodiments, the imaging sensor is capable of operation in non-visible spectra.

In another aspect, an imaging system is provided. The imaging system includes the stereo camera as described herein, particularly above, and at least one image processor. The at least one image processor is configured to receive first and second frames of image data from a stereo camera; and construct volumetric image data based on binocular disparity between the first and second frames.

Such volumetric data is useful for a variety of applications and provides a rich data set for subsequent video analytics.

In embodiments, the at least one image processor is configured to run a disparity matching algorithm that compares the first and second frames in determining the volumetric image data.

In embodiments, the at least one processor is configured to identify at least one candidate moving object in at least one of the first frame and/or the second frame, to determine a depth position of the at least one candidate moving object based on the volumetric image data and to clip the volumetric image data about the at least one candidate moving object. Such clipped data confines subsequent processing to three-dimensional areas of interest, which can improve classification and other image processing results and improve algorithmic efficiency of the apparatus.

In embodiments, the at least one processor is configured to identify at least one candidate moving object based on background model subtraction.

In embodiments, the at least one processor is configured to determine a bounding box about each at least one moving object, to determine a centroid for each bounding box and to determine a depth position of the centroid based on the volumetric image data.

In embodiments, the at least one processor is configured to build a predetermined size three-dimensional box from a ground plane corresponding to the depth position and to clip the volumetric image data based on the predetermined size three-dimensional box. In embodiments, the predetermined size is depth adaptive.

In embodiments, the at least one processor is configured to clip the volumetric image data in three dimensions. This feature allows irrelevant foreground and background information to be excluded, which would otherwise be included in a mono camera system.

In embodiments, a video analytics processing engine is included and is configured to detect at least one object based on the volumetric image data.

In embodiments, a video analytics processing engine is included and is configured to detect objects based on the clipped volumetric image data.

In embodiments, the video analytics processing engine is configured to exclude at least one object in the volumetric image data from further processing based on at least one of size in at least one dimension, height from ground plane and speed of movement. Such pre-processing, which can be realistic performed because of the use of volumetric image data, can reduce false positives.

In embodiments, the further processing is by an object classifier.

In another aspect, an image processor is provided that is configured to construct three-dimensional volumetric image data from at least one frame of imaging data, identify at least one candidate moving object in the at least one frame, determine a depth position of the at least one candidate moving object based on the volumetric image data, and clip the volumetric image data about the at least one candidate moving object to provide clipped volumetric image data for further processing by a video analytics engine including an object classifier.

The image processor of the present aspect is combinable with the stereo camera described in the foregoing and any of the features of the imaging system aspect. However, the volumetric image data of the present aspect is not necessarily provided by the stereo camera of the present disclosure or any stereo camera. The image processing features described herein are generally applicable for confining a search space and thus improve results and efficiency of subsequent processing.

In another aspect, a method of image processing is provided. The method includes constructing three-dimensional volumetric image data from at least one frame of imaging data, identifying at least one candidate moving object in the at least one frame, determining a depth position of the at least one candidate moving object based on the volumetric image data, and clipping the volumetric image data about the at least one candidate moving object to provide clipped volumetric image data for further processing by a video analytics engine including an object classifier.

In another aspect, software is provided. The software is configured to be run on at least one processor and is configured to construct three-dimensional volumetric image data from at least one frame of imaging data, identify at least one candidate moving object in the at least one frame, determine a depth position of the at least one candidate moving object based on the volumetric image data, and clip the volumetric image data about the at least one candidate moving object to provide clipped volumetric image data for further processing by a video analytics engine including an object classifier.

BRIEF DESCRIPTION OF THE DRAWINGS

Embodiments of the present invention will now be described by way of example only and with reference to the accompanying drawings where like parts are provided with corresponding reference numerals in which.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
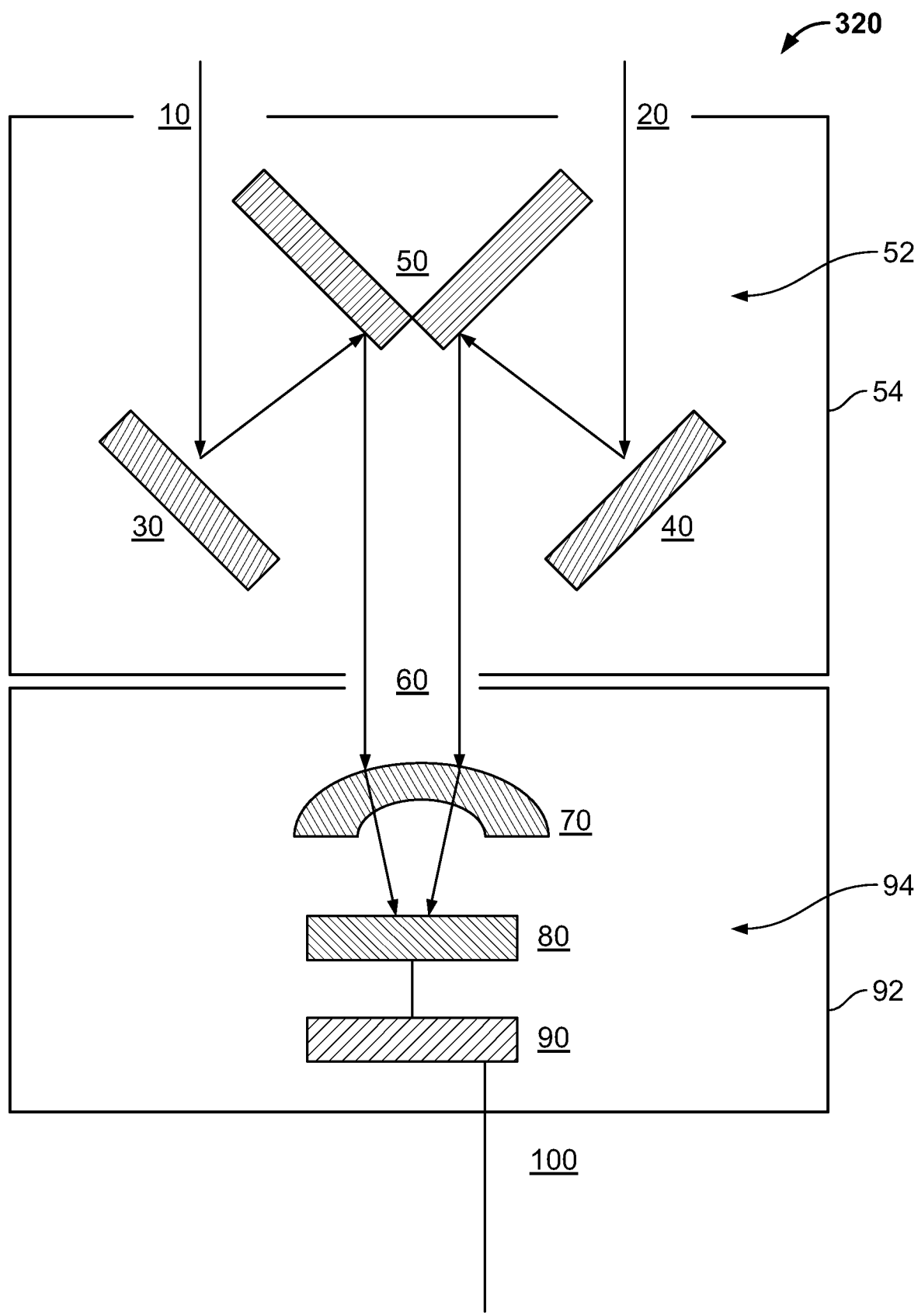
FIG. 1 provides a diagram to schematically demonstrate a stereo camera for capturing synchronised, side by side, frames for disparity image calculation, in accordance with an embodiment of the present disclosure.

Methods, systems and devices are disclosed to capture stereo disparity images in a side by side configuration on a single imaging sensor using an optical apparatus. An exemplary embodiment of a stereo camera 320 is shown in FIG. 1. Light separated by an intra-ocular distance is filtered between two apertures 10, 20. Light from a left hand binocular perspective enters aperture 10 and light from a right hand binocular perspective enters aperture 20. The left hand light is reflected by a first mirror 30 onto a central mirror 50 (a third mirror). The right hand light is reflected onto a second mirror 40 that reflects the light onto the mirror 50. This generates a side by side configuration on the mirror 50 that is reflected through an aperture 60 to a lens 70 where it is focused onto an imaging sensor 80 which captures the side by side, fully synchronised, image. In one embodiment of the invention this raw data is then sent to the processing unit over a network cable 100. In another embodiment, the raw data is sent to a processing unit 90 whereby the side by side image is compressed by an encoding mechanism. This compressed or uncompressed data is then transmitted to the processing unit over a network such as an Ethernet cable 100.

The stereo camera 320 provides a 3D camera that uses an optical apparatus 52 to capture side by side images on a single sensor 80 so that these images are automatically synchronised. In one embodiment, the optical apparatus includes a housing 54, such as a small rigid box, that affixes to a front of a housing 92 of a mono camera 94 such as a standard, low cost, CCTV camera. In another embodiment, the optical apparatus 52 is included in the housing 92 of the camera 94. That is, the optical apparatus 52 can be a separately attachable component or the optical apparatus 52 can be integrated into the camera 94. The optical apparatus 52 uses a mirror and lens configuration to receive light into two apertures 10, 20 which are separated by an inter-ocular distance and focus this light onto the single imaging sensor 80 in the camera 94 so that parallax pictures appear side by side. In one embodiment, the light from each aperture 10, 20 is projected by two surface mirrors 30, 40 at a 45 degree angle onto a third mirror with two faces parallel to each of the first mirrors 50 that reflects light onto a single imaging sensor 80 located in the camera 94. Though one skilled in the art would note that many other designs of mirrors and lenses could be employed to achieve the same effect of creating geometrically regular images with binocular disparity on a single sensor. In embodiments, the stereo camera 320 described herein produces first and second frames 400, 430 of imaging data corresponding to the side by side parallax images received at the image sensor 80.

Figure 2:
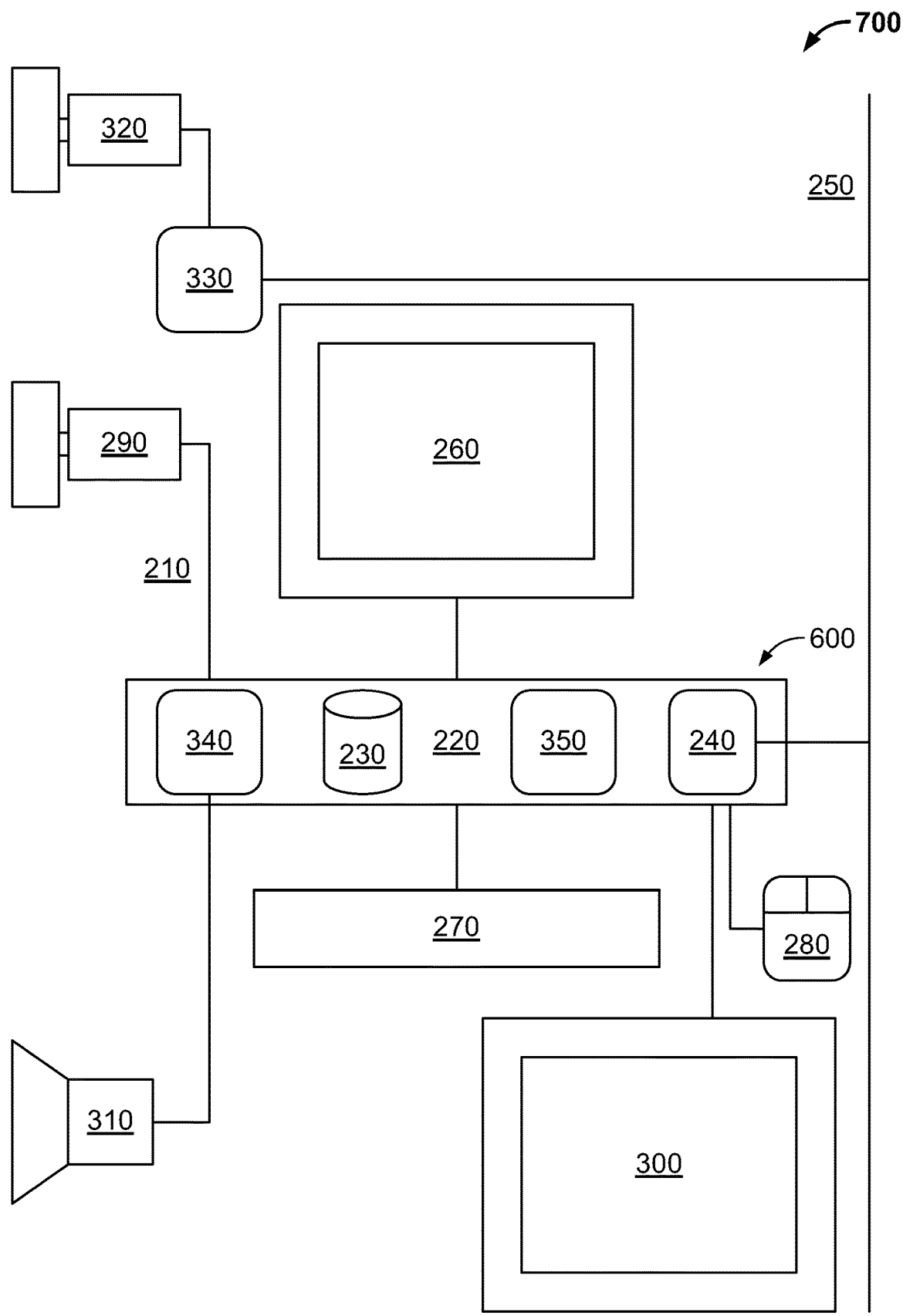
FIG. 2 provides a block diagram of an imaging system for constructing volumetric image data and for performing video analytics thereon, in accordance with an embodiment of the present disclosure.

An imaging system 700 in accordance with an exemplary embodiment of the present disclosure is schematically illustrated in FIG. 2. The imaging system 700 utilises an image processing system 600 (see FIG. 4) to process the frames 400, 430 into volumetric imaging data 648 based on binocular disparity processing. The volumetric imaging data 648 is, in embodiments, used in further image processing by the image processing system 600 as described further herein.

Figure 4:
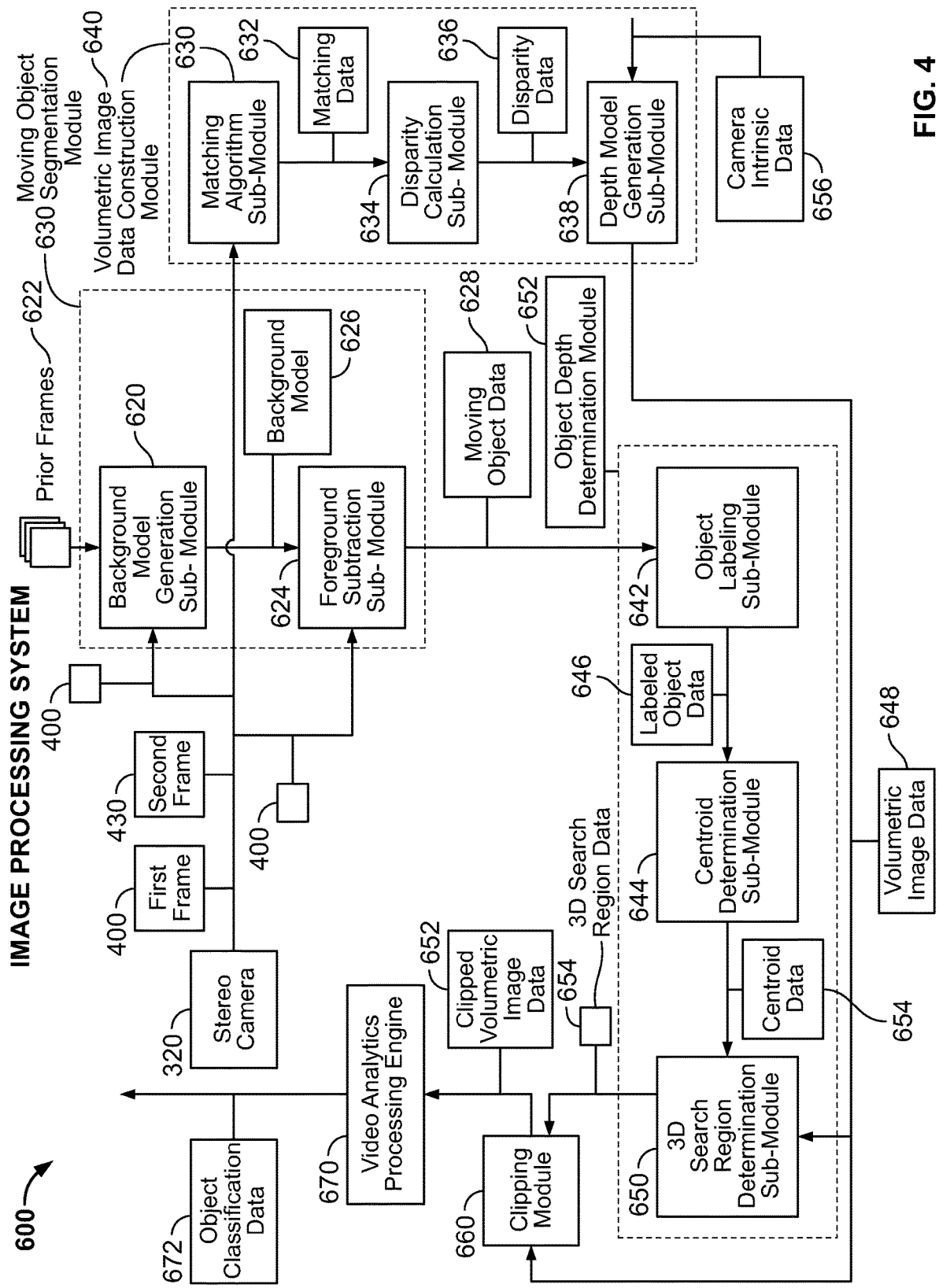
FIG. 4 provides an example data flow diagram of an image processing system, in accordance with an embodiment of the present disclosure.

The imaging system 700 includes image processing capability based on a general-purpose computer. The computer has a processor unit 220 (an image processor) having access to disk storage 230 (or other computer readable memory) for program and data, a network interface card 240 connected to a network 250 such as an Ethernet Network or the Internet. The modules and software features described herein are, in embodiments stored in the disk storage (or other computer readable memory) for execution by the processing unit 220. In some embodiments, the imaging system 700 includes a display device such as cathode ray tube or liquid crystal display device 260/310, a keyboard 270 and a user input device such as a mouse 280 or a touch screen (not shown). The imaging system 700 operates under program control, the programs being stored in the storage disk 230 (or other computer readable memory) and provided, for example, by the network 250, a removable storage disk (not shown) or a pre-installation on the disk storage 230. FIG. 4 illustrates one exemplary such software program for image processing in accordance with various embodiments.

A stereo camera 320 as described in FIG. 1, provides side-by-side, synchronised video to the network, usually through a router, switch or hub 330. The stereo camera 320 can be located locally (within a local area network), or on the internet or another public network. The incoming video streams received over the network can be compressed in a common compression format (VC-1, MJPEG, H264 etc.) over IP where these frames are then decompressed to raw pixel inputs in the format considered most convenient for image processing (YUV, RGB24 etc . . . ). Alternatively, a signal from a stereo camera 290, is consumed directly by a PCI-e bus and sent to a graphics card 340, where it is stored as a digitised frame. The accompanying program can be informed of the arrival of a new frame by a trigger or by the application polling the frame grabbers driver through an API. In either case video streams are consumed by the imaging system 700, particularly the image processor 220 thereof.

One skilled in the art would recognise that there are additional modalities that are capable of ingesting frames of video, but these are not listed for the sake of brevity.

Figure 3:
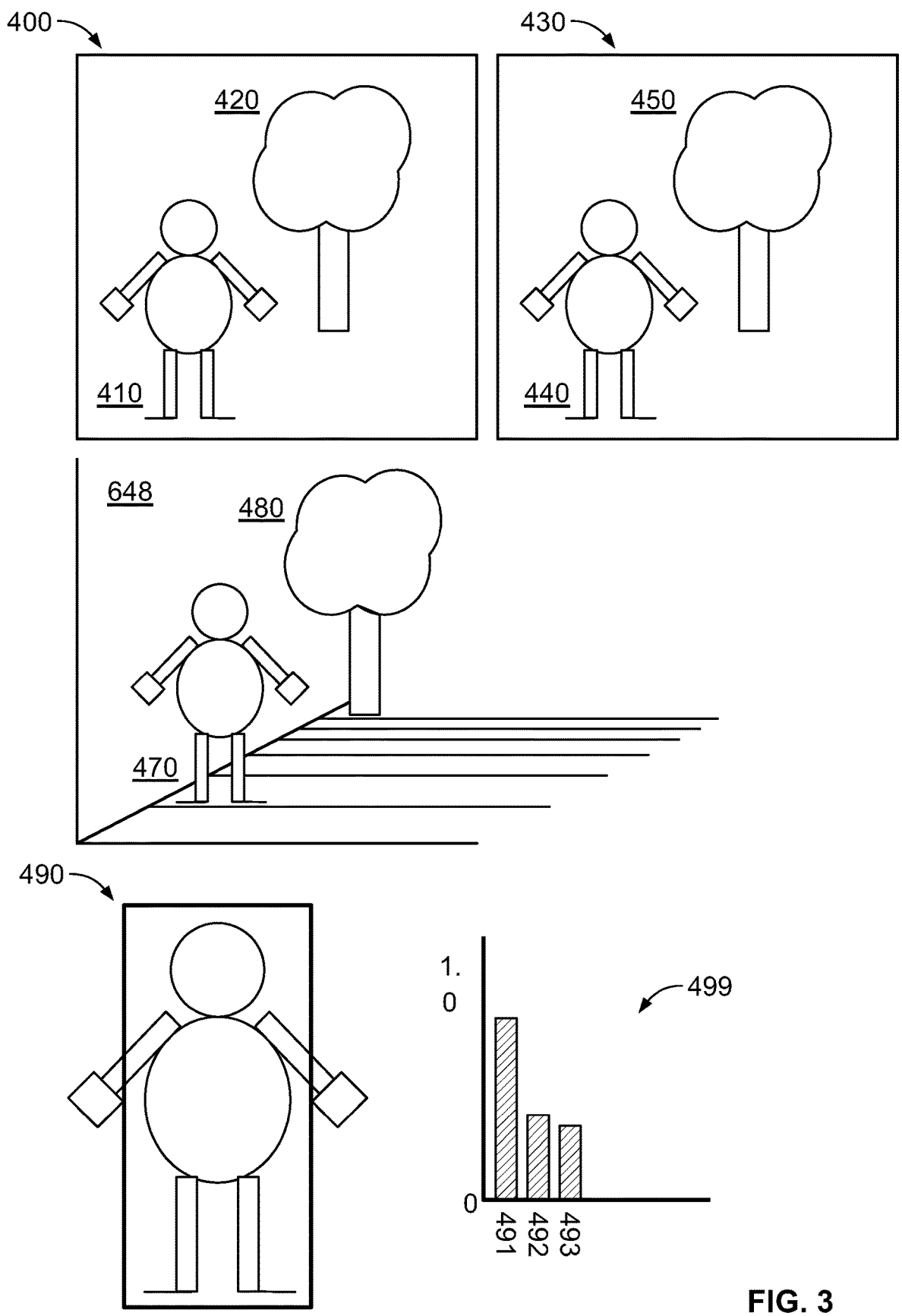
FIG. 3 provides a diagram of a method to reduce the number of false positive identifications in object detection within video streams through plane culling as a means to restrict the size of the camera frustum used when performing object identification, in accordance with an embodiment of the present disclosure.

The imaging system 700 is configured to perform image processing, e.g. Video Analytics, on incoming frames or series of frames 400, 430 (see FIGS. 3 and 4). These calculations can occur on a single CPU using the instructions provided by a running program or on multiple CPU's by dedicated hardware chips, programmable floating programmable gate arrays (FPGA) chips or co-processors of various types (vector processing units, GPGPU cards etc.). These hardware possibilities are represented schematically in FIG. 1 by item 350.

The side by side images captured by the stereo camera 320 are sent to the image processing system 600 of the imaging system 700 for disparity calculation. In various embodiments, the images are transmitted from the stereo camera to the image processing system 600, Video Analytics apparatus, by a direct wired connection or by a network. The frames 400, 430 of data are, in one embodiment, of a raw, uncompressed format. However, in another embodiment, the frames of data 400, 430 are encoded which shall reduce bandwidth usage in either the direct or network connection between the stereo camera 320 (3D image capture apparatus) and the image processing system 600 (Video Analytics processing apparatus). In one embodiment, the encoding and network transmission could be into H.264 elementary streams and could be achieved by a typical CCTV camera's onboard encoding chips. Video streaming to the image processing system could also be achieved by web streaming transmission chips which are common in modern IP CCTV cameras. In embodiments of the present disclosure, the optical apparatus 52 is added to a CCTV camera 94 which includes the imaging sensor 80, a video streamer encoder and a network transmission chip, thereby enabling a low-cost CCTV camera 94 to become an effective 3D sensor, which can transmit this data over long distances to a remote image processing system 600.

As described in the foregoing, the image processing system 600 receives raw or encoded side by side images. In the case of the encoded video stream, the imaging data must be decoded to raw frames 400, 430 of data in video format that is suitable for more complex image processing, Video Analytics tasks by the image processing system 600.

With reference to FIGS. 2 and 4, a volumetric image data construction module 640 of the image processing system 600 is configured to constructs a disparity map 648 from the synchronised side by side binocular frames of image data 400, 430, in accordance with some embodiments. The disparity map 648 can provide the depth of each pixel relative to an origin, so that each pixel now has an X, Y and Z value in volumetric image data 648 and a volumetric image may be constructed.

One exemplary method, the canonical method, to create a stereo disparity distribution of pixels between two frames requires that a pixel (or plurality of pixels), in one frame 400 is matched against a pixel (or plurality thereof) in a second frame 430. Usually, the sum of the absolute difference between pixel(s) in each frame is calculated to find the best candidate match pixel(s). The distance between the matching pixels is called the disparity and the disparity is assumed to represent the Z depth of the object which created the pixel on the cameras' sensor. In the most common configuration, a large disparity (matching pixels are far apart), will represent a region which is close to the camera, whilst a small disparity is represented by pixels that are further away. Differing camera intrinsics, i.e. camera intrinsic data 656, will produce slightly different results, but it is illustrative that, in general, the pixels' Z plane (distance generated from the disparity map 636 for all the pixels in a frame), is a function of the real-world depth observed. One skilled in the art would note that many other methods are available to create the depth map 648 from a disparity image.

The simplicity of the imaging system 700 belies it's far reaching implications. For the first time, the imaging system 700 will allow the collection of volumetric 3D video using PTZ cameras, in some embodiments. The stereo camera 320 and other aspects of the imaging system described herein shall be able to collect 3D video from cameras illuminated in different spectra, such as Infra-red (IR) or thermal cameras, in some embodiments. In contrast, to all other stereo cameras, the proposed camera shall use a single sensor, thus there is no need for synchronisation between two sensors. Thus, we can use any type of sensor including those with a very high Mega Pixel (MP) resolution and very high frame rates. In embodiments, the side by side picture is efficiently encoded to H.264 by camera hardware, so that this encoded stream requires a low volume of bandwidth during transmission and so shall not put undue stress on the network infrastructure. A single video analytics processing engine 670 will also be able to ingest multiple volumetric cameras streams simultaneously.

In some embodiments, the present disclosure provides a simple, elegant augmentation to a standard CCTV camera that will enable the 3D Video Analytics described above to be employed in real world environments using current network infrastructure, thus allowing the roll out of this technology with minimum disruption to the business process. Further, 3D Video Analytics, and its vast improvement in efficacy over conventional CCTV in monitoring crowded locations, will have the potential to be deployed, in accordance with various embodiments.

Since the optical apparatus 52 shall only project light onto a single sensor they can be affixed to low cost, off the shelf cameras 94, in some examples, that have never previously produced 3D data. For the first time PTZ cameras can be used in Video Analytics, commensurately reducing the number of cameras required to comprehensively monitor an area.

With reference to FIGS. 3 and 4, one example is described of image processing that can be achieved with point cloud data volumetric image data 648 that has been generated by the image processing system 600. One task that is desirable to perform is to identify a human intruder that has entered a sterile zone. This can be achieved by a computer apparatus performing image processing tasks, e.g. by the image processing system 600, on video streams (namely, successive instances of first and second frames 400, 430) of the zone. In particular, it is possible to perform object identification of the observed scene and thus determine if an intruder has entered into the safe zone in question rather than a different object or background clutter.

Object detection in a video stream will usually involve the use of several different computationally complex algorithms chained together, with each requiring large amounts of computer resources (CPU/GPU cycles etc.) to complete. Thus, arresting the calculations as soon as possible in this chain of algorithms (when a candidate object can be dismissed as being a false positive), is computationally advantageous and thus aids the overall efficiency of the machine.

Moreover, due to the considerable volume of data within each video frame, over any time scale greater than a few minutes, in a naturalistic scene, the mistaken identification of false positives is inevitable. This will lead to false alarms unless a mechanism is used to eliminate as many false positives as possible.

Embodiments of the image processing system 600 described herein allow exclusion of erroneous candidate objects at an early stage, as will be described further herein.

It is also noted that object detection suffers from the problem that, a description of the object that is too exacting, will reject many true positives when applied to an object that display elasticity in the real world (for example: the jointed limbs of a human). Thus, a more accommodating object descriptor is required, which in turn implies that more false positives will be generated to identify a significant number of true positives. Therefore, the ability to roughly accept object detection and then reject unsuitable candidates, will be more reliable for identifying elastic objects in real world scenarios.

For these reasons a mechanism to identify and reject false positives become hugely beneficial to an intruder alarm involved in object detection over the stated time periods. This image processing system 600 described herein is able to achieve this end, in accordance with various embodiments.

A depth map of an image is calculated as follows: a single frame of video, composed of two side-by-side binocular scenes (first and second frames 400, 430) with the synchronised timestamps are derived from the stereo camera 320 described above.

Continuing to refer to FIGS. 3 and 4, the image processing system 600 includes a moving object segmentation module configured to identify one or more candidate moving objects, in accordance with various embodiments. A first frame (for example, the Left hand Frame) 400 is used to identify the location of a potential candidate moving object that may represent a human intruder 410. It is not unreasonable to focus the at least one image processor's 220 limited computational power, as a first step, onto identifying moving objects, since the human 410 in question, must move into the scene. Such a moving human 410 is considered to be a foreground object.

In some embodiments, moving objects can be located by means of foreground background subtraction (e.g. via foreground subtraction sub-module 624) and/or much more complex methods known to one skilled in the art. A background model generation sub-module 620 maintains a pixel model 626 of the background. These background maintenance methods are well described and can be as simple as maintaining a running average of the frames of the luminance value of each pixel (within a specified time window). Alternatively, they can be as complex as storing Bayesian Probabilities of each pixel's value belonging to a background object. These methods generate a foreground and background model. The foreground model is usually a binary model of the pixels in the frame, describing if each pixel in the current frame is either a foreground pixel (pixel value=1) or has matched the background (pixel value=0). The background model is an RGB (colour) or luminance frame. The foreground model is representative of moving object data 628 generated by the moving object segmentation module 630.

Movement of objects in the physical background observed by the camera 320 is by definition limited. In one embodiment, a running average pixel model is maintained by the background model generation sub-module 620 as an example of the background model 626. In a further embodiment (not shown), a second background model is simultaneously maintained derived from a Gaussian Mixture Model of the pixels of the video stream.

In each case the foreground/background segmented object is identified and encapsulated by moving object data 628. The two frames 400, 430 of the stereo video are then used to create volumetric image data 648, schematically represented in FIG. 3, using the exemplary methods described above.

In embodiments, an object depth determination module 652 is configured to ascertain depth location (Z plane) of each moving object (represented schematically in FIG. 3 by item 490) by comparing a centroid of one or more moving objects (identified by moving object segmentation module 630) with the volumetric image data 648 or depth map obtained from stereo disparity calculations. Pixels within a threshold distance of that object (in Z and X/Y planes) are used to create a new image 652 (through clipping module 660) effectively filtering the volumetric image data 648 to create a new image which only contains the identified moving object in a 3D, spatial constrained region. In this way, a frustum of the region to search and/or the boundary box of the moving object in the X/Y/Z planes has been reduced.

One skilled in the art would recognize that using a centroid to identify the Z plane of the moving object is only one mechanism to ascertain the Z plane that the object inhabits. More robust estimates exist, such as identifying each pixel that is within the moving object 490, retrieving it's Z plane and building a histogram of these values 499. In this case, the modal Z plane is the chosen to represent the entire objects location. Alternatively, even more complex models may be chosen such as measuring the distance of the pixels from the mean of all pixels within the moving object.

In embodiments, all pixels within the Z plane clipped frustum (clipped volumetric image data 652) are then sent to a final Video Analytics processing engine 670 where object identification may be achieved by known methods.

The image processing system 600 provides a powerful technique since it decreases search space for individual objects by introducing another physically restrictive dimension to the search space in the analysis.

Dynamic movement in a scene can be due to movement in the background objects (trees blowing in wind, Item 420, 450 and 480 in FIG. 3), as well as movement in a foreground object (person walking in front of the camera 320). The co-occurrence of both of these observations are reasonably likely to occur. That is, a person walking into a scene with dynamic moving vegetation. In a 2D projection of the 3D scene this can lead to the intruder's shape being obscured by the moving background objects and thus a false negative identification. By clipping the frustum of each moving object, the image processing system 600 is effectively excluding the movement of background objects and this is seen schematically in FIG. 3, where item 480 is pushed into a different region than the intruder 470 shown in FIG. 3. Further now that the Z depth of the object is available in addition to it's X and Y bounding box co-ordinates, it is possible, using the camera intrinsic functions to calculate the true size, speed and direction of the moving objects irrespective of its location in the depth plane. Thus, objects of the correct size to be a human can be included as a candidate intruder, whilst those that are too small or too large can be removed as candidates. Additionally or alternatively, those that are moving too fast can also be removed.

Having described principles of the image processing system 600 in identifying moving objects, constructing volumetric image data and clipping the volumetric image data for subsequent process, the various operations are described in greater detail with reference to FIG. 4.

FIG. 4 further discloses the image processing system 600 described in the foregoing, in accordance with one embodiment. The image processing system 600 is disclosed in terms of modules, data processed thereby and some hardware elements. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. Generally, the modules and sub-modules disclosed herein are executed by at least one image processor, which is embodied by the processing unit 220 of FIG. 2. It will be understood that sub-modules and modules can be alternatively sub-divided or combined and the shown arrangement is merely by way of example.

A stereo camera 320 is configured to capture images that are provided to the image processing system 600 as first and second frames 400, 430. Generally, the stereo camera 320 is a stereo camera 320 as hereinbefore described whereby the first and second frames 400, 430 are derived from a single chip imaging sensor so that synchronization of imaging data obtained from plural imaging sensors is not required. However, it is conceivable that some embodiments utilize other types of stereo camera. Indeed, the principles of moving object segmentation, moving object depth determination and search space clipping as described with reference to FIG. 4 (modules 630, 652, 660) could be based on volumetric (depth) imaging data that has been obtained otherwise than by stereo camera (e.g. through time of flight based three-dimensional imaging, ranging cameras, three-dimensional imaging, etc.).

A moving object segmentation module 630 is configured to segment moving object data 628 from parts of the imaging data that are substantially static in at least one of the first and second frames 400, 430. In the disclosed embodiment, the moving object segmentation module 630 is configured to operate on just one frame of imaging data, specifically the first frame 400. In one embodiment, a background generation sub-module 620 is configured to generate a background model 626 based on one or more stored prior frames 622. The moving object segmentation module 630 includes a foreground subtraction sub-module 624 configured for subtraction of the background model 626 from the first frame 400, thereby generating the moving object data 628.

Image processing system 600 includes a volumetric image data construction module 640 configured to generate volumetric image data 648 based on binocular disparity processing on first and second frames 400, 430. In embodiments that do not use stereoscopic camera 320, other types of processing are performed to construct volumetric image data 648 (depth map). In one embodiment, the volumetric image construction module 630 includes a matching algorithm sub-module 630 configured to match pixels in one frame 400 to pixels in the other frame 430. In one example, a matching algorithm compares horizontal windows of pixels in corresponding horizontal lines of the first and second frames 400, 430 to find closest match, thereby corresponding pixels from one frame 400 to matching pixels in the other frame 430. The matching algorithm sub-module thus determines matching data 632 representing a transformation from the first frame 400 to the second frame 430 on a pixel by pixel basis (or pixels by pixels basis) to match the frames 400, 430.

Based on the matching data 632, the disparity calculation sub-module 634 is configured to determine disparity data 636 representing a binocular disparity at pixel level (or at least groups of pixels) between first frame 400 and second frame 430. A depth model generation sub-module is configured to determine volumetric image data 648 (depth map) based on the disparity data 636 and a known relationship (inversely proportional) between length of disparity and distance from stereo camera 320. In some embodiments, the known relationship factors in one or more parameters from camera intrinsic data 656. The volumetric image data 648 includes pixel data according to the pixel data included in one of the first frame 400 or the second frame 430 (minus any left and right edge regions where the first and second frames 400, 430 do not overlap) and an additional dimension corresponding to depth. Thus, each pixel could include x, y, and depth values. A frame of such data roughly corresponding in size to the first and the second frame 400, 430 is provided in the volumetric image data 648.

The image processing system 600 includes an object depth determination module 652 configured to label at least one moving object, to transform the at least on moving object (or a derived part thereof) into three-dimensional image space using the volumetric image data (depth map) 648 and to define a three-dimensional search region about the at least one moving object. More specifically, and in one embodiment, the object depth determination module 652 includes an object labelling sub-module 642 configured to label one or moving objects based on the moving object data 628 from the moving object segmentation module 630, so as to provide labeled object data 646. In a specific example, the object labelling sub-module is configured to by connecting pixels in the moving object data 628 (e.g. 4-fold or 8-fold connecting). There are algorithms to do this such as flood fill and other connected component labelling algorithms. Each of the foreground object's pixels are given the same value which then becomes the object number or label.

A centroid determination sub-module 644 is configured to determine a centroid for each labeled moving object in the labeled object data 644 by forming a bounding box about each labeled moving object and deriving the centroid of the bounding box. Centroid data 654 is thus produced representing one or more centroids of moving objects. In one example, the centroid determination sub-module 644 is configured to find an origin of each labelled object and count the maximum width and height of each object to set a bounding box. There are other ways to do bounding boxes (e.g. by a contour map, etc). The centroid determination sub-module is configured to find a mid-point of the bounding box or boxes to provide the centroid data 654.

Each of these centroids can be transformed into volumetric image space by looking up the centroid's two-dimensional position in the volumetric image data 648 and finding the corresponding depth data. This transformation operation is performed through a 3D search region determination sub-module 650. From the three-dimensional centroid positions, the 3D search region determination sub-module 650 is configured to determine a three-dimensional search region (or three-dimensional bounding box) thereabout. In one embodiment, the 3D search region determination sub-module 650 is configured to find the ground plane vertically beneath each centroid in three-dimensional image space using reference information and to position a three-dimensional bounding box about on the ground plane that extends about the centroid. The dimensions of the three-dimensional bounding box are depth adapted. In this way, one or more three-dimensional bounding boxes are defined corresponding to each moving object that correspond to three-dimensional search regions embodied in the 3D search region data 654.

In accordance with various embodiments, the clipping module 660 is configured to clip the volumetric image data based on the 3D search region data 654, thereby providing clipped volumetric image data. In this way, a significantly reduced search frustum is provided for further analysis by the video analytics engine 670 and processing of a mixture of moving and static objects as a result of working on two-dimensional data is avoided.

In embodiments, the image processing system 600 includes the video analytics engine 670 that is configured to classify each moving object in the clipped volumetric image data 652. The video analytics engine 670 includes a classifier for classifying objects. In some embodiments, the classifier utilises an object classification algorithm. The object classification algorithm utilises at least one of object dimensions, classical neural network methods and deep learning to classify objects. In embodiments, collections are kept of the moving objects on a frame by frame basis so that classification values are added and averaged over time. Based on the running average, classifications that breach a threshold can be determined to correspond to a particular classification such as a human subject.

In embodiments, the video analytics engine 670 is configured to exclude clipped volumetric image data 652 from further classification processing when it is deemed not relevant. Such pre-processing enhances efficiency of the video analytics engine 670 and helps to avoid false positives. For detection of human subject in security applications, image data can be excluded from further processing based on height of centroid above ground plane (i.e. height of moving object), speed of moving object (which requires processing of data from prior frames to determine speed) and dimensions of moving object (particularly height). In this way, objects that are too fast, too wide/deep, too high above ground plane, too tall are excluded when their values are unrealistic to represent a human. Camera intrinsic data 656 is used in some embodiments, to convert dimensions in volumetric image data 648 to real-world dimensions to allow speed and size exclusion to be performed effectively.

While at least one exemplary aspect has been presented in the foregoing detailed description of the invention, it should be appreciated that a vast number of variations exist. It should also be appreciated that the exemplary aspect or exemplary aspects are only examples, and are not intended to limit the scope, applicability, or configuration of the invention in any way. Rather, the foregoing detailed description will provide those skilled in the art with a convenient road map for implementing an exemplary aspect of the invention. It being understood that various changes may be made in the function and arrangement of elements described in an exemplary aspect without departing from the scope of the invention as set forth in the appended claims.

ITEMS OF THE DISCLOSURE

The following alphabetized items represent a summary of generalized features disclosed herein. The claims of the invention follow.
A. A method and apparatus for creating 3D data of a scene suitable for video analytics processing, the method comprising:
   capturing a plurality of images on a single sensor by use of an optical apparatus;
   transmission of said plurality of images to a processing apparatus for analysis.
B. A method and apparatus for creating 3D data of a scene suitable for video analytics, the method comprising according to Item A, wherein:
   said optical apparatus is composed of an enclosure comprising two apertures separated by an interocular distance;
   light entering the two apertures is reflected onto mirrors which subsequently reflect this light onto a further mirror on which both scenes appear in a known geometric layout as a single composite image;
   said composite image is further reflected to an imaging sensor which digitizes the scene;
   said digitized scene is transmitted to a computer for video analytics processing.
C. A method and apparatus according to foregoing Items, wherein said digitized side-by-side scene is ingested by an encoding apparatus and compressed prior to transmission to a video analytics processing apparatus.
D. A method and apparatus according to foregoing Items, wherein said digitized side-by-side scene is used in collection of volumetric 3D video using PTZ cameras.
E. A method and apparatus according to foregoing Items, wherein said digitized side-by-side scene shall use a single sensor, thus there is no need for synchronisation between two sensors.
F. A method and apparatus according to foregoing Items wherein said sensor possess' a high Mega Pixel (MP) resolution.
G. A method and apparatus according to foregoing Items wherein said sensor possess' a high frame rate.
H. A method and apparatus apparatus according to foregoing Items, that may be affixed to an extant CCTVC camera, to allow this camera to produce point cloud data.
I. A method and apparatus according to foregoing Items, wherein said digitized side-by-side scene is received by a sensor that operates in the non visible spectra.
J. A method and apparatus for creating 3D data of a scene suitable for video analytics as shown in FIG. 1.
K. A method and apparatus for creating 3D data of a scene suitable for video analytics as shown in FIG. 2.
L. A storage medium configured to store the computer program embodying the foregoing method and apparatus.
M. A method and apparatus to reduce the number of false positive identifications in object detection within a video stream through plane culling, the method comprising:
   deriving a depth map of an image;
   Storing a plurality of images as a model background;
   deriving a foreground/background model of the image, thereby identifying the location of potential candidate moving objects;
   deriving a plurality of segments in an image, each comprising combinations of a bounding area of one or more said candidate objects;
   isolating the said moving objects in a single or plurality of dimensions; and sending these clipped segment containing the moving object for identification to a Video Analytics engine.
N. A method and apparatus according to foregoing Items, wherein the said depth map is derived from a disparity map between 2 binocular images.
O. A method and apparatus according to foregoing Items, wherein the background model is representative of the windowed running average model of the stored image.
P. A method and apparatus according to foregoing Items, wherein the background model is represented by a single image stored prior to the current image.
Q. A method and apparatus according to foregoing Items, wherein the background model is representative of a Gaussian mixture model of the stored images.
R. A method and apparatus of foregoing Items, wherein the background model is representative of a Bayesian mixture model of the stored images.
S. A method and apparatus according to foregoing Items, wherein the plurality of moving objects are clipped in an combination of the X plane, Y plane or Z plane.
T. A method and apparatus according to foregoing Items 19, wherein the clipping box is represented by the bounding box of the said moving object.
U. A method and apparatus according to foregoing Items, wherein the Z plane of the object is derived from the centroid of the Z planes of all the foreground pixels of the moving object within the bounding box.
V. A method and apparatus according to foregoing Items, wherein the Z plane of the object is derived from the mean of the Z planes of all the foreground pixels of the moving object within the bounding box.
W. A method and apparatus according to foregoing Items, wherein the Z plane of the object is derived from the modal Z value of the Z planes of all the foreground pixels of the moving object within the bounding box.
X. A method and apparatus according to foregoing Items, whereby the size of the moving object can be calculated from camera intrinsics without the noise of scene clutter which is derived from a mismatched Z plane.
Y. A method and apparatus according to foregoing, wherein the speed of the moving object can be calculated from the camera intrinsics over a specified number of frames, without the noise of scene clutter from a mismatched Z plane.
Z. A method and apparatus to reduce the number of false positive identifications in object detection within a video stream through plane culling as shown in FIG. 3.
AA. A computer program comprising computer readable instructions which, when loaded into a computer, configure the computer to perform a method according to any of the foregoing Item.
BB. A storage medium configured to store the computer programs described herein therein and thereon.

What is claimed is:
1. An imaging system, comprising:
   an imaging sensor capable of operation in the visible and non-visible spectra;
   a stereo camera comprising first and second apertures separated by an interocular distance and configured to focus first and second images from first and second mirrors onto a third mirror that reflects first and second light beams side by side to form a composite image on the imaging sensor;

a digital signal compression apparatus configured to encode the composite image into compressed data; and a network connecting the stereo camera to at least one image processor and transmitting the compressed data from the stereo camera to the at least one image processor, wherein the at least one image processor is configured to receive the compressed data via the network,
decode the compressed data to extract first and second frames of image data from the stereo camera,
construct volumetric image data based on binocular disparity between the first and second frames,
identify at least one candidate moving object, and
clip the volumetric image data around the at least one candidate moving object to create a new image which only contains the at least one candidate moving object in a 3D spatially constrained region.

2. The imaging system of claim 1, wherein the stereo camera comprises a mono camera including a mono surveillance camera lens and a mono surveillance camera imaging sensor as said imaging sensor and a first housing for the mono camera,
wherein the stereo camera has a second housing, and
wherein the second housing is mounted to the first housing to allow conversion of the mono camera to the stereo camera.

3. The imaging system of claim 1, wherein the at least one image processor is configured to run a disparity matching algorithm that compares the first and second frames in determining the volumetric image data.

4. The imaging system of claim 3, wherein the at least one processor is configured to identify the at least one candidate moving object in at least one of the first frame and the second frame, to determine a depth position of the at least one candidate moving object based on the volumetric image data and to clip the volumetric image data about the at least one candidate moving object in three dimensions in the X/Y/Z planes.

5. The imaging system of claim 4, further comprising a video analytics processing engine configured to detect objects based on the clipped volumetric image data.

6. The imaging system of claim 4, wherein the at least one processor is configured to identify the at least one candidate moving object based on background model subtraction.

7. The imaging system of claim 4, wherein the at least one processor is configured to build a predetermined size three-dimensional box from a ground plane corresponding to the depth position and to clip the volumetric image data based on the predetermined size three-dimensional box.

8. The imaging system of claim 7, wherein the predetermined size is depth adaptive.

9. The imaging system of claim 3, further comprising:
a video analytics processing engine configured to detect at least one object based on the volumetric image data.

10. The imaging system of claim 9, wherein the video analytics processing engine is configured to exclude at least one object in the volumetric image data from further processing based on at least one of size in at least one dimension, height from ground plane and speed of movement.

11. The imaging system of claim 10, wherein the further processing is by an object classifier.

12. An imaging system, comprising:
an imaging sensor capable of operation in the visible and non-visible spectra;
a stereo camera comprising first and second apertures separated by an interocular distance and configured to focus first and second images from first and second mirrors onto a third mirror that reflects first and second light beams side by side to form a composite image on the imaging sensor; and
an image processor, configured to
receive first and second frames of image data from the stereo camera,
construct volumetric image data based on binocular disparity between the first and second frames,
run a disparity matching algorithm that compares the first and second frames in determining the volumetric image data,
identify at least one candidate moving object in at least one of the first frame and the second frame,
determine a depth position of the at least one candidate moving object based on the volumetric image data,
determine a 3D bounding box about each at least one moving object,
determine a centroid for each 3D bounding box,
determine a depth position of the centroid based on the volumetric image data, and
clip the volumetric image data about the at least one candidate moving object along the associated 3D bounding box in the X/Y/Z planes.

13. An imaging system, comprising:
a plurality of stereo cameras each comprising
an imaging sensor capable of operation in the visible and non-visible spectra, and
an optical apparatus comprising first and second apertures separated by an interocular distance and configured to focus first and second images from first and second mirrors onto a third mirror that reflects first and second light beams side by side to form a composite image on the imaging sensor; and
a network connecting the plurality of stereo cameras to an image processor, each camera transmitting imaging data over the network;
wherein the image processor is configured
to receive the imaging data from the network and extract first and second frames of image data corresponding to the side by side composite images of one of the plurality of stereo cameras, and construct volumetric image data based on binocular disparity between the first and second frames, and
to identify at least one candidate moving object, and
to clip the volumetric image data around the at least one candidate moving object to create a new image which only contains the at least one candidate moving object in a 3D spatially constrained region.

* * * * *